United States Patent [19] | [11] Patent Number: 4,828,925
Miyake et al. | [45] Date of Patent: May 9, 1989

[54] MAGNETIC DISC

[75] Inventors: Akira Miyake; Hitoshi Nagatani; Tsugihiro Doi, all of Otokuni; Kunio Mizushima; Akito Sakemoto, both of Tsukuba, all of Japan

[73] Assignee: Hitachi Maxell, Ltd., Osaka, Japan

[21] Appl. No.: 875,581

[22] Filed: Jun. 18, 1986

[30] Foreign Application Priority Data

Jun. 20, 1985 [JP] Japan ................................. 60-135800

[51] Int. Cl.⁴ ................................................. G11B 5/71
[52] U.S. Cl. ............................... 428/425.9; 252/62.54; 427/128; 428/694; 428/695; 428/900
[58] Field of Search ............... 428/694, 695, 425.9, 428/900, 328, 329; 252/62.54; 360/134–136; 427/128, 131

[56] References Cited

U.S. PATENT DOCUMENTS

| 4,172,176 | 10/1979 | Tanaka | 428/411 |
| 4,247,407 | 1/1981 | Naruse | 427/128 |
| 4,383,000 | 5/1983 | Fujiki | 428/900 |
| 4,383,001 | 5/1983 | Fujiki | 428/522 |
| 4,405,481 | 9/1983 | Yamada | 428/900 |
| 4,420,540 | 12/1983 | Ogawa | 428/900 |
| 4,522,885 | 6/1985 | Funahashi | 428/900 |
| 4,595,640 | 6/1986 | Chernega | 428/900 |
| 4,601,946 | 7/1986 | Iida | 428/695 |
| 4,647,502 | 3/1987 | Miyake | 428/323 |
| 4,652,500 | 3/1987 | Ejiri | 428/329 |
| 4,666,784 | 3/1987 | Imukai | 428/408 |

Primary Examiner—Ellis P. Robinson
Attorney, Agent, or Firm—Birch, Stewart, Kolasch & Birch

[57] ABSTRACT

A magnetic disc which comprises a non-magnetic support substrate and a magnetic layer thereon consisting of a magnetic coating comprising ferromagnetic powder, a binder, an aliphatic acid ester having a melting point not higher than 10° C. and an aliphatic acid ester having a melting point from 15° to 60° C., the magnetic coating having improved lubricity and durability.

5 Claims, No Drawings

MAGNETIC DISC

BACKGROUND OF THE INVENTION

1. Field of the Invention

The present invention relates to a magnetic disc, and more particularly, it relates to a magnetic disc with improved lubricity comprising a non-magnetic support substrate and a magnetic layer consisting of a magnetic coating which is formed on at least one surface, preferably on both surfaces of the substrate and comprises ferromagnetic powder and a binder.

2. Discussion of Related Art

It has been proposed and practically employed to add a liquid lubricant to a magnetic coating of an audio tape or a video tape so as to decrease sliding friction between a magnetic coating surface and a magnetic head. For the video tape and the like, since it has better lubricating properties than other liquid lubricants, an aliphatic acid ester is used in order to satisfy both lubricity and strength of the magnetic layer in relation with the so-called steel characteristic which relates to repeated sliding contact of the magnetic coating with the magnetic head.

In this connection the following Patent Publications can be referred to:

Japanese Patent Publication Nos. 23899/1968, 12950/1972, 14648/1972, 26882/1972, 13042/1973, 15002/1973, 2414/1983 and 23008/1984, Japanese Patent Kokai Publication 117735/1980, 117739/1980, 130435/1980 and 173835/1980 and U.S. Pat. No. 4,465,737.

The addition of the aliphatic acid ester to the magnetic coating satisfactorily increases lubricity, strength and durability of the magnetic coating of the video tape and the like.

Recently, a floppy disc is increasingly required to have better lubricity of the magnetic coating and durability and strength of the magnetic layer.

The reasons for such requirements are as follows:

1. In case of the floppy disc, since a search and transmission time of data is shortened with the development of peripheral equipment for recording and reproducing, it is necessary to rotate the floppy disc at a high rate;
2. The floppy disc is slidingly forced against both its surfaces in such a state that it is held between a pair of the magnetic heads or between a magnetic head and a support member;
3. To increase a linear recording density, the thickness of the ferromagnetic coating layer should be decreased;
4. A so-called metal floppy disc which contains, for example, metal iron powder as the ferromagnetic powder has a softer coating than a floppy disc which contains a metal oxide as the ferromagnetic powder so that it has a larger coefficient of friction when slidingly contacted with the magnetic head.

For the above reasons, more improved and different lubricating properties are required for the magnetic coating of the video tape or the floppy disc.

Since a relative sliding speed between the magnetic head and the surface of the magnetic coating is increased, heat is generated at the contact part between the two due to sliding so that the binder resin contained in the magnetic coating thermally deteriorates. Therefore, the magnetic coating is severely damaged by the deterioration of the binder and sliding force.

In view of the above, as a result of extensive study by the present inventors to develop a magnetic disc satisfying both good lubricity and strength, namely durability of the magnetic coating, the following facts were found:

In order to improve the lubricity of the magnetic coating, use of a large amount of a liquid lubricant is particularly effective, since the liquid lubricant has good compatibility with the binder resin contained in the magnetic coating so that it can be contained in the magnetic layer in a larger amount. However, since the binder resin attracts a large number of the lubricant molecules, it swells so that its inherent binding force for the magnetic powder is decreased, which results in deterioration of the magnetic layer.

Since the durability of the magnetic layer is deteriorated, if the amount of the lubricant is greatly increased it is desirable for the lubricant to be locally contained near the surface layer of the magnetic coating which is in sliding contact with the magnetic head and not homogeneously throughout the magnetic coating.

Further investigation was carried out by the inventors based on the above findings to reveal the following:

When a solid aliphatic acid ester was used as a lubricant, even if it was homogeneously dispersed in the magnetic coating, it migrated toward the surface of the magnetic coating because it has a poor compatibility with the binder resin as compared with the liquid lubricant and a smaller specific gravity than the binder resin and the magnetic powder.

Thus, a magnetic disc utilizing a solid aliphatic acid ester as the lubricant was produced and examined to find that it had good lubricity and durability. However, after such a magnetic disc was stored for a long period of time, its lubricity and durability were again examined to find that the lubricity greatly deteriorated.

To clear up the cause of the deterioration of the lubricity, the surface of the magnetic coating was carefully studied. As a result, white powder was found to be present on the surface of the magnetic coating. The analysis of the white powder revealed that it was separated solid aliphatic acid ester.

As a result of further study to prevent such separation of the aliphatic acid ester, it has been concluded that some stabilizer must be added to the magnetic coating, in addition to the binder resin and the solid aliphatic acid ester, which is locally present near the surface of the coating.

SUMMARY OF THE INVENTION

Therefore, one object of the present invention is to provide a magnetic disc comprising a magnetic coating with prolonged lubricity and durability but no substantial decrease of strength.

Another object of the present invention is to provide a magnetic disc comprising a magnetic coating containing a solid aliphatic acid ester as a lubricant and having improved lubricity and durability.

These and other objects are accomplished by a magnetic disc according to the present invention which comprises a non-magnetic support substrate and a magnetic layer consisting of a magnetic coating which is formed on at least one surface of the substrate and comprises ferromagnetic powder, a binder, an aliphatic acid ester having a melting point not higher than 10° C. (hereinafter referred to as "low melting point aliphatic acid ester") and an aliphatic acid ester having a melting point of 15° to 60° C. (hereinafter referred to as "high melting point aliphatic acid ester).

DETAILED DESCRIPTION OF THE INVENTION

The present invention has been completed based on the finding that when a liquid aliphatic acid ester, namely an ester having a melting point not higher than 10° C. is contained in the magnetic coating in addition to the solid aliphatic acid ester, the liquid ester is stably compatible with the binder resin and has good chemical affinity with the solid ester so that lubricity and durability of the magnetic coating are improved.

The low melting point aliphatic acid ester acts as a stabilizer for the high melting point aliphatic acid ester in the magnetic coating. Specific examples of such an ester are n-butyl oleate, hexyl oleate, n-octyl oleate, 2-ethylhexyl oleate, oleyl oleate, n-butyl laurate, heptyl laurate, n-butyl myristate, n-butoxyethyl oleate, trimethylolpropane trioleate, and the like. These esters may be used alone or as a mixture. Among them, 2-ethylhexyl oleate is preferred.

The high melting point aliphatic acid ester imparts lubricity to the magnetic coating without deteriorating the strength of the coating layer. Specific examples of such an ester are stearyl laurate, cetyl laurate, myristyl laurate, stearyl myristate, cetyl myristate, myristyl myristate, stearyl palmitate, cetyl palmitate, myristyl palmitate, lauryl palmitate, cetyl stearate, myristyl stearate, lauryl stearate, n-butyl stearate, lauryl myristate, lauryl laurate, n-butoxyethyl stearate, n-butoxypropyl stearate, n-pentaoxyethyl stearate, and the like. These esters may be used alone or as a mixture. Among them, n-butoxyethyl stearate is preferred.

The low melting point ester links the binder resin with the high melting point ester localized near the surface of the coating. The binder resin used may be any one of conventionally used binder resins and includes copolymers of vinyl chloride, cellulose resins, polyurethane resins, polyacetal resins, polyester resins, isocyanate compounds and the like. A molecular weight of the binder resin is preferably from 5,000 to 50,000, more preferably 10,000 to 40,000. The isocyanate compound may have a molecular weight lower than this range. Among the above resins, preferred are the polyurethane resins, particularly branched polyurethane resin having primary hydroxyl groups attached to its backbone chain ends and the branched chain ends.

A total amount of the low molecular weight aliphatic acid ester and the high molecular weight aliphatic acid ester may be 10 to 100% by weight, more preferably 15 to 70% by weight per weight of the binder resin. When the total amount is less than the above lower limit, the desired effects are not exerted. When it is larger than the above upper limit, white powder is formed on the magnetic coating surface so that the lubricating effect is decreased, the magnetic head is contaminated and the magnetic coating is deteriorated, which causes flaws of the magnetic layer.

A weight ratio of the low melting point ester and the high melting point ester is 10:1 to 1:10, preferably 10:1 to 1:1, more preferably 10:1 to 3:1.

When the amount of the low melting point ester is too large, the magnetic coating tends to be easily deteriorated. When the amount of the high melting point ester is too large, the white powder tends to be formed on the coating surface.

The ferromagnetic powder to be contained in the magnetic coating is preferably of an acicular form with a particle size of 0.2 to 0.5 μm and an axis ratio of 6 to 10. For high density recording, ferromagnetic powder having a specific surface area of 15 to 60 m$^2$/g measured by the BET method is preferred. Also, ferromagnetic powder comprising the plate form or hexagonal system particles can be used.

Specific examples of the ferromagnetic powder are metal oxides (e.g. $\gamma$-Fe$_2$O$_3$, Fe$_3$O$_4$, an intermediate oxide of $\gamma$-Fe$_2$O$_3$ and Fe$_3$O$_4$, cobalt-containing $\gamma$-Fe$_2$O$_3$, cobalt-containing Fe$_3$O$_4$, a cobalt-containing intermediate oxide of $\gamma$-Fe$_2$O$_3$ and Fe$_3$O$_4$, CrO$_2$, etc.), magnetic metals (e.g. iron, nickel, cobalt, etc.), alloys of the magnetic metal and other metal, nitrides of the formula: Fe$_x$N, and the like. The plate form or hexagonal system magnetic powder includes barium ferrite, strontium ferrite, and the like.

Properties such as coercive force and saturation magnetization of the magnetic powder are appropriately selected and adjusted according to the output characteristics of the magnetic disc. Particularly, when high saturation magnetization of the magnetic disc is desired, magnetic metal powder is used. Since the magnetic metal powder has smaller Mohs' hardness and is softer than the metal oxide magnetic powder or the nitride magnetic powder, it increases the friction coefficient of the magnetic coating against the magnetic head and decreases the strength of the coating. Therefore, the effects of the addition of the ester mixture according to the present invention are most effectively exerted when the magnetic metal powder is used. The amount of the ferromagnetic powder may be 10 to 1,000% by weight, more preferably 100 to 500% by weight based on the total weight on the low melting point ester, the high melting point ester and the binder resin. When it is too small, output of the recorded signal is lowered. When it is too large, the powder falls off.

The magnetic coating may contain conventional additives such as an abrasive, a surfactant, an antistatic agent and so on.

As the abrasive, particularly preferred is alumina powder with a particle size of 0.2 to 1 μm and a BET specific surface area not larger than 10 m$^2$/g. As the surfactant, any of the conventional ones such as aliphatic acids may be used. The surfactant may be coated on or compounded in the magnetic coating. As the antistatic agent, any of the liquid or solid ones may be used. Carbon black is a preferred antistatic agent.

The amounts of these additives may be the same as contained in a conventional magnetic coating.

The magnetic coating may be prepared by a per se conventional method. For example, all or some of the components are charged in a suitable mixing equipment such as a kneader, a ball mill, a sand mill or a pebble mill and compounded. During compounding, a suitable solvent such as toluene, methyl ethyl ketone, methyl isobutyl ketone and cyclohexanone may be used.

PREFERRED EMBODIMENTS

Practical and preferred embodiments of the present invention are illustrated by the following examples, in which parts and percentages are by weight unless otherwise indicated.

EXAMPLE 1

Following components were mixed and dispersed in a ball mill for 72 hours.

| Component | Parts |
| --- | --- |
| Metal iron powder<br>(BET specific surface area, 50 m²/g;<br>Coercive force, 1,530 Oe; Particle size,<br>0.3 μm; Axis ratio, 8; Saturation<br>magnetization, 125 emu/g) | 100 |
| Vinyl chloride-vinyl acetate-vinyl alcohol<br>copolymer<br>("VAGH" manufactured by UCC (USA).<br>Molecular weight, 40,000) | 11 |
| Polyurethane resin<br>(Branched polyurethane having intermediate<br>and end primary hydroxide groups.<br>Molecular weight, 10,000) | 7 |
| α-Al₂O₃<br>(Particle size, 0.7 μm) | 10 |
| 2-Ethylhexyl oleate<br>(Low melting point aliphatic acid ester) | 3 |
| n-Butoxyethyl stearate<br>(High melting point aliphatic acid ester) | 4 |
| Carbon black<br>("Stering" manufactured by Cabot (USA).<br>Particle size, 75 mμ; BET specific<br>surface area, 25 m²/g) | 15 |
| Toluene | 150 |
| Cyclohexanone | 150 |

Then, an isocyanate compound ("Colonate L" manufactured by Nippon Polyurethane Co., Ltd.) (4 parts) was added to the mixture and kneaded for another one hour to obtain a magnetic coating composition.

The composition was coated with a gravure coater on both surfaces of a non-magnetic substrate made of a polyethylene terephthalate film of 32 μm in thickness so that the thickness of each coating after dried was 4.0 μm. Thereafter, the coated substrate film was calendered and punched to produce a magnetic disc of 47 mm in diameter (Sample No. 1).

EXAMPLE 2

In the same manner as in Example 1 but using cobalt-containing γ-Fe₂O₃ powder (BET specific surface area, 20 m²/g; particle size, 0.4 μm; axis ratio, 8; coercive force, 650 Oe; saturation magnetization 79 emu/g) in place of the iron metal powder, a magnetic disc was produced (Sample No. 2).

EXAMPLE 3

In the same manner as in Example 1 but using a low melting point aliphatic acid ester and/or a high melting point aliphatic acid ester as shown in Table 1, a magnetic disc was produced (Sample Nos. 3-7).

TABLE 1

| Sample<br>No | Low melting point<br>aliphatic acid eater | High melting point<br>aliphatic acid ester |
| --- | --- | --- |
| 3 | n-Butyl oleate | n-Butoxyethyl stearate |
| 4 | Oleyl oleate | ↑ |
| 5 | n-Butyl laurate | ↑ |
| 6 | Oleyl oleate | Stearyl laurate |
| 7 | 2-Ethylhexyl oleate | ↑ |

EXAMPLE 4

In the same manner as in Example 1 but using 2-ethylhexyl oleate and n-butoxyethyl stearate in amounts (parts) as shown in Table 2, a magnetic disc was produced (Sample Nos. 8-12).

TABLE 2

| Sample<br>No. | 2-Ethylhexyl oleate<br>(part) | n-Butoxy stearate<br>(part) |
| --- | --- | --- |
| 8 | 1.5 | 1.5 |
| 9 | 1 | 10 |
| 10 | 5 | 5 |
| 11 | 10 | 1 |
| 12 | 8 | 8 |

EXAMPLE 5

In the same manner as in Example 1 but using no vinyl chloride-vinyl acetate-vinyl alcohol copolymer and using 18 parts of the polyurethane resin, a magnetic disc was produced (Sample No. 13).

EXAMPLE 6

In the same manner as in Example 2 but using nitrocellulose (H ½ second) in place of the vinyl chloride-vinyl acetate-vinyl alcohol copolymer, a magnetic disc was produced (Sample No. 14).

COMPARATIVE EXAMPLES 1-5

In the same manner as in Example 1 but using a lubricating compound as shown in Table 3 in place of the mixture of the low melting point ester and the high melting point ester, a magnetic disc was produced (Sample Nos. A-F).

TABLE 3

| Sample No. | Lubricating compound | Parts |
| --- | --- | --- |
| A | 2-Ethylhexyl oleate | 3 |
| B | 2-Ethylhexyl oleate | 7 |
| C | n-Butoxyethyl stearate | 4 |
| D | 2-Ethylhexyl oleate<br>Palmitic acid | 3<br>4 |
| E | Silicone oil<br>n-Butoxyethyl stearate | 3<br>4 |
| F | Oleic acid<br>Palmitic acid<br>Amyl stearate | 3<br>3<br>4 |

After kept standing at 80° C., 60% PH for 16 hours, each of the sample magnetic discs was slidingly contacted with a Mn-Zn ferrite magnetic head at 3,600 rpm. Every one hour, contamination of the magnetic head and formation of flaws on the magnetic coating surface were visually observed.

Each sample was kept standing at 5° C. for 1,000 hours and examined for formation of white powder on the coating surface before sliding contact with the magnetic head.

The formation of the white powder and a period of time till the coating surface was flawed are shown in Table 4.

TABLE 4

| Sample<br>No. | Formation of<br>white powder | Period of time till<br>caoting was flawed<br>(hrs) |
| --- | --- | --- |
| 1 | No | 80 |
| 2 | No | 135 |
| 3 | No | 75 |
| 4 | No | 74 |
| 5 | No | 70 |
| 6 | No | 70 |
| 7 | No | 72 |
| 8 | No | 76 |
| 9 | No | 81 |
| 10 | No | 89 |
| 11 | No | 93 |
| 12 | No | 95 |

TABLE 4-continued

| Sample No. | Formation of white powder | Period of time till caoting was flawed (hrs) |
|---|---|---|
| 13 | No | 90 |
| 14 | No | 152 |
| A | No | 5 |
| B | No | 16 |
| C | Yes | 75 |
| D | Yes | 9 |
| E | Yes | 70 |
| F | Yes | 12 |

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A magnetic disc comprising a non-magnetic support substrate having a magnetic layer on at least one surface thereof consisting of a magnetic coating comprising ferromagnetic powder, a binder, an aliphatic acid ester having a melting point not higher than 10° C. selected form at least one member of the group consisting of n-butyl oleate, hexyl oleate, n-octyl oleate, 2-ethylhexyl oleate, oleyl oleate, n-butyl laurate, heptyl laurate, n-butyl myristate, n-butoxyethyl oleate and trimethylolpropane trioleate and an aliphatic acid ester having a melting point of from 15° to 6° C. selected from at least one member of the group consisting of n-butoxyethyl stearate and n-butoxypropyl stearate, wherein the total amount of the aliphatic acid ester having a melting point not higher than 10° C. and the aliphatic acid ester having a melting point of 15° to 60° C. is from 10 to 100% by weight per weight of he binder resin, and wherein the weight ratio of said aliphatic acid ester having a melting point not higher than 10° C. and the aliphatic acid ester having a melting point of from 15° to 60° C. is from 10:1 to 1:10.

2. The magnetic disc according to claim 1, wherein said aliphatic acid ester having a melting point not higher than 10° C. is 2-ethylhexyl oleate.

3. The magnetic disc according to claim 1, wherein said aliphatic acid ester having a melting point of from 15° to 60° C. is n-butoxyethyl stearate.

4. The magnetic disc according to claim 1, wherein said ferromagnetic powder is magnetic metal powder.

5. The magnetic disc according to claim 1, wherein said binder resin is a polyurethane resin.

* * * * *